United States Patent [19]

Shimizu et al.

[11] 3,720,857
[45] March 13, 1973

[54] APPARATUS FOR DETECTING A POSITION OF ELECTRON BEAM FOR USE WITH A CATHODE-RAY TUBE

[75] Inventors: Tetsuji Shimizu, Nagoya, Aichi; Sohei Hibino, Nagoya, Aichi; Hajime Sumida, Showa-ku, Nagoya; Shinichi Ueno, Kita-ku, Nagoya; Tateki Muraoka, Matsushin-cho, Kasugai, all of Japan.

[73] Assignee: Kabushiki Kaisha Tokai Rika Denki Seisakusho, Nishi-Kasugai-gun, Aichi Prefecture, Japan

[22] Filed: Feb. 2, 1970

[21] Appl. No.: 7,708

[30] Foreign Application Priority Data

Feb. 7, 1969 Japan .................................. 44/8666

[52] U.S. Cl. ............... 315/10, 250/217 CR, 328/147, 307/235
[51] Int. Cl. ...................... H01j 39/12, H01j 31/26
[58] Field of Search ... 315/10; 250/217 CR; 328/147, 328/148; 307/235 A

[56] References Cited

UNITED STATES PATENTS

| | | | |
|---|---|---|---|
| 3,447,026 | 5/1969 | Townsend | 315/10 X |
| 3,228,002 | 1/1966 | Reines | 340/149 |
| 3,505,666 | 4/1970 | Thorpe | 250/217 CR |
| 3,293,452 | 12/1966 | Horwitz et al. | 328/148 |

Primary Examiner—Benjamin A. Borchelt
Assistant Examiner—H. A. Birmiel
Attorney—Woodhams, Blanchard & Flynn

[57] ABSTRACT

The present invention discloses comprising a cathode-ray tube having a fluorescent screen and a plurality of deflecting plates, a light sensitive means consisting of two or more photocells arranged so as to exactly confront the fluorescent screen of the cathode-ray tube, and an electric circuit connected to said light sensitive means and selecting a maximum signal out of signals applied from said cathode-ray tube, thereby detecting a position of signal. As the electric circuit connected to the light sensitive means and selecting the maximum signal, there may be employed an electric circuit which comprises operational circuits, relays and diodes and is adapted to select two signals in combination out of three signals produced on the signal source and provide an output of positive, negative or zero voltage, thereby operating any of relays through the diode to indicate the maximum signal, thereby improving the operational reliability and reducing the manufacturing cost.

10 Claims, 2 Drawing Figures

PATENTED MAR 13 1973 3,720,857

INVENTORS
TETSUJI SHIMIZU
SOHEI HIBINO
HAJIME SUMIDA
SHINICHI UENO
TATEKI MURAOKA

BY *Woodhams, Blanchard & Flynn*

ATTORNEYS

APPARATUS FOR DETECTING A POSITION OF ELECTRON BEAM FOR USE WITH A CATHODE-RAY TUBE

This invention relates to an apparatus for detecting a position of electron beam radiated from the electron gun of a cathode-ray tube.

An object of the present invention is to provide an apparatus for detecting a position of electron beam in a cathode-ray tube in which a position of electron beam radiated from a cathode-ray tube onto a light sensitive means can be detected by a maximum signal selection circuit including relays or switching transistors and amplifiers, and the position of electron beam which is shifted by the cathode-ray tube according to the output signal from the control system connected to the tube is efficiently detected by said maximum signal selection circuit, and fed back to the servo motor or the like, so that it is most suitably employable for controlling the servo motor or the like.

A further object of the present invention is to provide an apparatus for detecting a position of electron beams in the cathode-ray tube wherein a desired pattern is previously prepared on a light sensitive means for receiving the said electron beam such as selenium photocell, so that the controlled object can be most suitably controlled according to the said pattern.

A still further object of the present invention is to provide an apparatus for detecting a position of electron beam in which a maximum signal is successively selected out of three signals always varying according to output signal by means of a plurality of operational amplifiers, and one or more relays or switching transistors are turned to an on or off position according to the selected signal.

A further object of the present invention is the provision of an apparatus for detecting a position of electron beam in a cathode-ray tube in which the circuit is differentially operated by three input signals so that the circuit is operated with accuracy and reliability irrespective of a signal level, more specifically when the whole of three signals for comparison is situated at a low level or at a high level.

A still further object of the present invention is to provide an apparatus for detecting a position of electron beam in a cathode-ray tube wherein a maximum signal selection circuit is used; two signals are applied to the input terminal of the operational circuit in which these two signals are compared, and the result of comparison is given by an output of a positive voltage, a negative voltage or zero voltage, to the result that there needs no logical circuit, but only needs three diodes, so that the circuit construction becomes very simple.

A still further object of the present invention is to provide an apparatus for detecting a position of electron beam in the cathode-ray tube wherein the construction of circuit is simple, the operation is accurate with no probability of failure, and the nominal life is prolonged.

A gist of the present invention lies in an apparatus for detecting a position of the electron beam for use with a cathode-ray tube which comprises a cathode-ray tube having a fluorescent screen and a plurality of deflecting plates to which two varying signals are applied, a light sensitive means such as a selenium photocell divided into two or more regions according to a desired pattern and arranged so as to exactly confront the fluorescent screen of the cathode-ray tube, said two or more regions being electrically connected with each other by an electric circuit connected to said light sensitive means, said electric circuit selecting a maximum signal out of input signals applied from said cathode-ray tube onto said light sensitive means, thereby detecting a position of signal.

The maximum signal selection circuit employable with this apparatus comprises a plurality of operational amplifier circuits, diodes and relays or the like and connected to each of said photocells, said plurality of operational amplifier circuits selecting a maximum signal out of output signals produced on the photocells by the electron beam of cathode-ray tube, said diodes and relays being connected to an output terminal of each of said operational amplifier circuits, said diodes being connected to each operational circuit so as to operate only the relay connected to the operational circuit where the maximum signal is selected.

In the accompanying drawings showing a preferred embodiment of an apparatus for detecting a position of electron beam in a cathode-ray tube according to the present invention;

Figure 2:
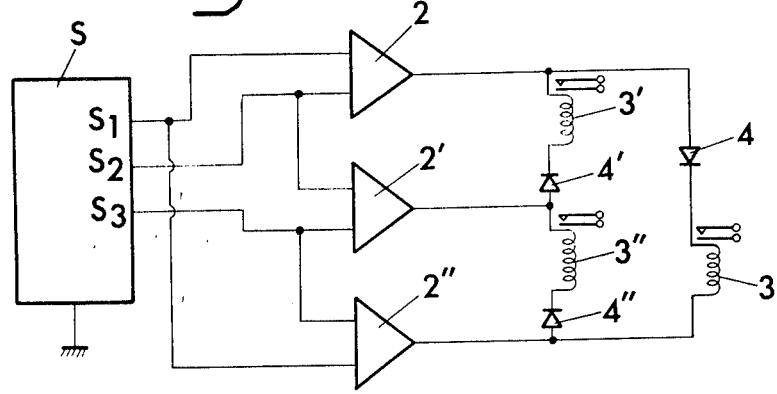
FIG. 2 is a connection diagram of a maximum signal selection circuit.

An embodiment of the present invention will now be described more fully with reference to the accompanying drawings. For a better understanding, the maximum signal selection circuit will be first described. Referring to FIG. 2, S is a signal source for producing three signals, for example, $S_1$, $S_2$ and $S_3$. Numerals 2, 2', 2'' denote operational amplifiers each having two input terminals. Said signal source S and operational amplifiers 2, 2', 2'' are connected to each other as follows: the signal $S_1$ is applied to the operational amplifiers 2 and 2'', the signal $S_2$ to the operational amplifiers 2'' and 2, and the signal $S_3$ to the operational amplifiers 2'' and 2'. The operational amplifier 2 compares the signal $S_1$ with the signal $S_2$, and where the signal $S_1$ is larger than the signal $S_2$, an output of positive voltage is provided, while if the signal $S_1$ is smaller than the signal $S_2$, an output of negative voltage is produced. Similarly, the operational amplifier 2' produces an output of positive voltage where signal $S_2$ is larger than the signal $S_3$, and provides an output of negative voltage if the signal $S_2$ is smaller than the signal $S_3$, and the operational amplifier 2'' produces an output of positive voltage if the signal $S_3$ is larger than the signal $S_1$, and provides an output of negative voltage if the signal $S_3$ is smaller than the signal $S_1$.

3 denotes a relay connected between the operational amplifiers 2 and 2'' and 4 denotes a diode the anode of which is connected to the output terminal of the operational amplifier 2, and the cathode of which is connected to the coil of the relay 3. 3' denotes a relay connected between the operational amplifiers 2 and 2' and 4' denotes a diode the anode of which is connected to the output terminal of the operational amplifier 2' and the cathode of which is connected to the coil of the relay 3'. 3'' denotes a relay connected between the operational amplifiers 2' and 2'', and 4'' denotes a diode the anode of which is connected to the output terminal of the operational amplifier 2'' and the cathode of which is connected to the coil of the relay 3''.

The operation of the circuit is as follows. Assuming that the signal voltage originating from a signal source S is is, for example, 12V and the signal $S_1$ is larger than the signal $S_2$ or $S_3$, an operational amplifier 2 produces the output of +12V while the operational amplifier 2' produces an output of any of +12V, 0V, or −0V according to the magnitude of the signal $S_2$ and the signal $S_3$, and the operational amplifier 2'' produces −12V as its output voltage. In this case, the output voltage of the operational amplifier 2 is positive and that of the operational amplifier 2'' is negative, so that current flows through the diode 4 and the relay 3, thereby closing the contact of relay 3. On the other hand, where the output voltage of the operational amplifier 2' is +12V, as that of the operational amplifier 2 is also +12V, no current flows and the relay 3' remains unenergized as does relay 3''. If the output voltage of the operational amplifier 2' is 0V, as the output voltage of the operational amplifier 2'' is −12V, so that no current flows through the relays 3', 3''. If the output voltage of the amplifier 2' is −12V, the relay 3' remains unenergized since the diode 4' is reverse biased and relay 3'' is also not energized so that only the relay 3 closes its contacts. By a similar analysis, it will be found that, if the signal $S_2$ is larger than the signal $S_3$ and the signal $S_1$, current flows through only the relay 3' and only its contacts are closed, and if that the signal $S_3$ is larger than the signal $S_1$ on the signal $S_2$, current flows through only the relay 3'' and only its contacts are closed.

Where these signals are in such relationship that the signals $S_1 = S_2 >$ the signal $S_3$, the output voltages of the operational amplifiers 2, 2' and 2'' are 0V, +12V, and −12V, respectively, so that the relays 3 and 3' are energized and close their contacts. Similarly, when $S_2 = S_3 > S_1$, the contacts of the relays 3' and 3'' are closed, and if $S_3 = S_1 > S_2$, the contacts of the relays 3'' and 3 are closed.

Where the magnitudes of three signals $S_1$, $S_2$ and $S_3$ are equal, all the outputs of the operational amplifiers 2, 2', 2'' are 0V, so that the relays 3, 3', 3'' are unenergized.

In this embodiment, the relays 3, 3', 3'' are employed to indicate which of the three signals is the largest, but needless to say, in place of the relays 3, 3', 3'', semiconductors, for instance, switching transistors, may be suitably used.

Figure 1:
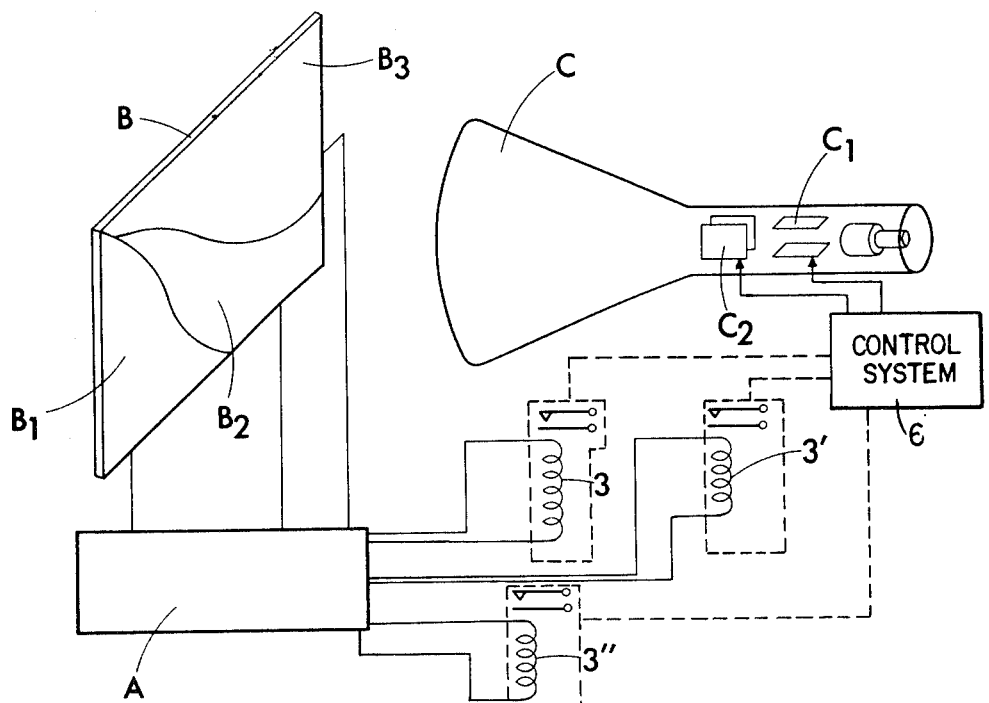
FIG. 1 is a perspective view illustrating the apparatus.

In FIG. 1, A denotes the aforementioned maximum signal selection circuit, and B denotes a light sensitive means such as selenium photocells which serves as the signal source for said maximum signal selection circuit A and is divided into more than two domains according to a desired pattern. In detail, the light sensitive means consists of more than two, here three, photocells $B_1$, $B_2$, $B_3$ adjacent each other. C denotes a cathode-ray tube or a Braun tube including horizontal deflecting plates $C_2$ and vertical deflecting plates $C_1$ and a fluorescent screen. The light sensitive means B is arranged so as to exactly confront the fluorescent screen of the cathode-ray tube C. The input terminal of the cathode-ray tube C is connected to the output terminal of a control system 6 so that the electron beam in the cathode-ray tube is moved according to output of the control system.

The operation will be described. The electron beam (and resulting light spot) is positioned on the fluorescent screen by the action of the vertical deflecting plate $C_1$ and the horizontal deflecting plate $C_2$. If the electron beam is positioned in the region of the photocell $B_1$, the maximum signal selection circuit A detects that the electron beam is positioned in that region and amplifies the signal, thereby operating the relay or switching transistor corresponding to the said photocell $B_1$. If the relays are connected to the input terminal of the control system 6 and feedback is applied, then control is made. When the spot formed by the electron beam is positioned, for example, on a boundary line of the photocells $B_1$ and $B_2$, and the spot covers more of the region of the photocell $B_1$ than of the region $B_2$, the signal voltage of said photocell $B_1$ is greater, so that the relay 3 corresponding to the photocell $B_1$ is caused to operate.

Furthermore, when the electron beam is positioned in the very middle portion between the photocells $B_1$ and $B_2$, said relay 3 is maintained operating due to the hysteresis error of said relay 3. When the position of electron beam is slightly deflected to the region $B_2$, the relay 3' is operated while the relay 3 becomes inoperative. Similarly, when the electron beam is positioned in the domain of a photocell $B_3$, the relay 3'' comes to operation. And if necessary, a desired pattern being drawn on the photocell B, the control system can be controlled according to the said pattern.

Needless to say, any circuit of the type may be employed in the apparatus for detecting a position of electron beam of the present invention, instead of the maximum signal selection circuit of the present invention.

As is obvious from the foregoing description, the present invention has many advantages as follows: The electron beam in the cathode-ray tube is operated by the output signals of the control system and received by a light sensitive means composed of more than two selenium photocells; The output voltage of the said light sensitive means is selected by the maximum signal selection circuit; and the position of electron beam on the light sensitive means is indicated through the operation of relays; the output is fed back to the control unit, thereby automatically controlling the apparatus, and operating it accurately. Furthermore, if a desired pattern is preliminarily prepared on the light sensitive means an object can be most suitably controlled according to said pattern.

The maximum signal selection circuit employed in the apparatus of the present invention has such advantages that every two different signals selected out of three signals are applied in combination to three operational circuits as the input and the output of positive, negative or zero voltage is provided therein; the maximum signal is indicated through three diodes connected to operational circuit, without employing a complicated electric circuit such as a logical circuit; and all of three signals to be compared can be accurately operated upon whether they are located on a low level or on a high level, which enhances the reliability of circuit operation.

The embodiments of the invention in which an exclusive property or privilege is claimed are defined as follows:

1. An apparatus for detecting the position of the electron beam of a cathode-ray tube comprises a cathode-ray tube having a fluorescent screen and a plurality of deflecting plates to which two varying signals are applied, a light sensitive means divided into two or more regions according to a desired pattern and arranged so as to exactly confront the fluorescent screen of the cathode-ray tube, said two or more regions being connected to each other, and electric circuit means connected to said regions of said light sensitive means and responsive to relative values of light initiated signals from respective pairs of regions for selecting the maximum one of such signals and thereby detecting the one of said regions at which said electron beam is aimed to indicate the current position of said beam.

2. An apparatus for detecting a position of electron beam for use with a cathode-ray tube as claimed in claim 1, wherein the electric circuit means connected to the light sensitive means is a maximum signal selection circuit including a plurality of operational amplifier circuits, diodes and relays, said plurality of operational amplifier circuits receiving corresponding light initiated signals and providing an output of negative, positive or zero voltage, each of said relays being connected to an output terminal of a corresponding operational amplifier circuit, means connecting each of said diodes to a corresponding operational amplifier circuit for operating a corresponding one of said relays, the operated one of said relays corresponding to the region having the maximum light initiated signal.

3. An apparatus as claimed in claim 1 in which said light sensitive means comprises a plurality of selenium photocells defining said regions.

4. An apparatus as claimed in claim 1, wherein the electric circuit means connected to the light sensitive means is a maximum signal selection circuit including a plurality of operational amplifier circuits corresponding in number to the number of regions in said light sensitive means, each of said operational amplifier circuits having two inputs, the light initiated signal from each region being applied to an input of each of two operational amplifier circuits, the two inputs of each operational amplifier circuit being connected to different regions, the operational amplifier circuits each providing an output of negative, positive or zero voltage in relationship of the two inputs thereto, a plurality of unidirectional conducting output devices corresponding in number to the number of operational amplifier circuits, said output devices being connected in a closed unidirectional conducting series loop, means connecting each said output device in said loop between the outputs of a corresponding pair of said operational amplifiers whereby said operational amplifiers will actuate the one of said output devices corresponding to the region of said light sensitive means providing the maximum light initiated signal.

5. An apparatus as claimed in claim 4 wherein said output devices each comprise a diode and a serially connected relay coil having switch contacts actuable thereby, the diodes in said series loop all being oriented in the same direction.

6. An apparatus as claimed in claim 4 including means for controlling the position of the electron beam in response to the condition of said output devices.

7. An apparatus as claimed in claim 1, in which said light sensitive means includes at least three said regions and in which said electric circuit means comprises a plurality of difference detecting means corresponding in number to the number of regions and each having two inputs, one input of each difference detecting means being connected to a corresponding region and the second input thereof being connected to a different region, none of said second inputs being connected to the same region, each of said difference detecting means having an output, and means connecting said outputs of said plurality of difference detecting means for determining which of said regions is producing the maximum light initiated signal.

8. An apparatus as claimed in claim 7 in which said means connecting said outputs comprises one unidirectionally conducting output switch means for each region, each output switch means having a first terminal connected to the output of the one of said difference detecting means whose first input is connected to the corresponding region and having a second terminal connected to the output of another said difference detecting means whose first input connects to the same region as the second input of said one difference detecting means, said outputs of said plurality of difference detecting means varying in amplitude in accordance with the differences in light initiated signals from the regions connected thereto, said output switch means each being responsive to a voltage drop in one direction between the outputs of said difference detecting means connected thereto for conducting therebetween, the one of said output switch means which conducts being that corresponding to the region at which the electron beam is directed.

9. An apparatus for detecting the position of the light spot of a cathode-ray tube, the apparatus comprising a light sensitive means which is divided into two or more regions according to a desired pattern, which is arranged to produce an output for each region in dependence upon the light incident thereon, and which is intended to be arranged in front of the flourescent screen of the cathode-ray tube, a maximum signal selection circuit, the outputs of the light sensitive means being connected to the maximum signal selection circuit, said maximum signal selection circuit including means responsive to said light-dependent outputs of respective pairs of regions for detecting the one of said regions opposed to said light spot.

10. An apparatus for detecting the position of the spot of a cathode-ray tube, the apparatus comprising a light sensitive means which is divided into at least three regions according to a desired pattern, which is arranged to produce an output for each region in dependence upon the light incident thereon, and which is intended to be arranged in front of the fluorescent screen of the cathode-ray tube, a maximum signal selection circuit, the outputs of the light sensitive means being connected to the maximum signal selection circuit, wherein the maximum signal selection circuit comprises a plurality of operational amplifiers each of which is connected to receive two of the outputs of the light sensitive means, and is arranged to produce a positive signal when one output is greater, a negative signal when the other output is greater and a zero signal when the outputs are equal, no two operational amplifiers being connected to receive an identical pair of outputs, the output of each operational amplifier being connected to the output of each other operational amplifier through an individual circuit comprising a switching device and a diode in series.

* * * * *